Dec. 7, 1943.    G. LAUBE ET AL    2,336,104
ADJUSTABLE CAMERA MOUNT
Filed June 25, 1941    3 Sheets-Sheet 1

INVENTORS
Grover Laube
Robert C. Stevens
ATTORNEY

Dec. 7, 1943.  G. LAUBE ET AL  2,336,104
ADJUSTABLE CAMERA MOUNT
Filed June 25, 1941   3 Sheets-Sheet 3

INVENTORS
Grover Laube
Robert C. Stevens.
BY
ATTORNEY

Patented Dec. 7, 1943

2,336,104

UNITED STATES PATENT OFFICE 2,336,104

ADJUSTABLE CAMERA MOUNT

Grover Laube and Robert Colby Stevens, Los Angeles, Calif., assignors to Twentieth Century-Fox Film Corporation, Los Angeles, Calif., a corporation of New York Application June 25, 1941, Serial No. 399,640

7 Claims. (Cl. 248—183)

This invention relates to the art of photography and deals with a camera mount having in addition to the features of the regular camera free-head other features which render it particularly useful in making composite pictures in the art of motion picture or still photography.

The invention to be hereinafter described is an adjustable camera mount wherein universal movement may be given to a camera mounted thereon. The primary purpose of the invention is to provide means for aligning a camera in making composite pictures. However, the invention is not to be confined to this particular use, since it will become obvious that the mount to be described may be useful in any photographic department where a nice, precise movement of the camera amounting to a universal movement is required. To those versed in the art of making composite pictures, it is well known that when used in this work a camera is lined up by means of cross hairs and consequently must be capable of being moved with precise, minute adjustments in all directions. The ordinary free-head provides only a panning and a tilting movement. In addition to these movements, it is an object of this invention to provide a camera mount wherein the camera may be moved up and down, back and forth on two tracks at right angles to each other, rocked on two axes at right angles to each other, and rotated on a vertical axis, all these movements being made with means which provides a fine, precisely controlled movement in any direction desired. The combined result of these movements is a universal movement embodied in a unitary camera mount.

Another object is to provide a camera mount of the character described that may be mounted upon the ordinary conventional camera support now in use, such as the tripod or camera carriage. Other objects and advantages will appear as the description proceeds in conjunction with the drawings in which.

Briefly stated and generally speaking, the invention comprises a supporting member A, a traveling member B arranged to be moved upon A, a second traveling member C arranged to be moved upon B, a rotatable member D arranged to travel with C and rotate with respect thereto, a camera supporting member E pivotally mounted upon the member D, together with means for providing the movements mentioned and means for supporting the above assembly.

Figures 1, 5:
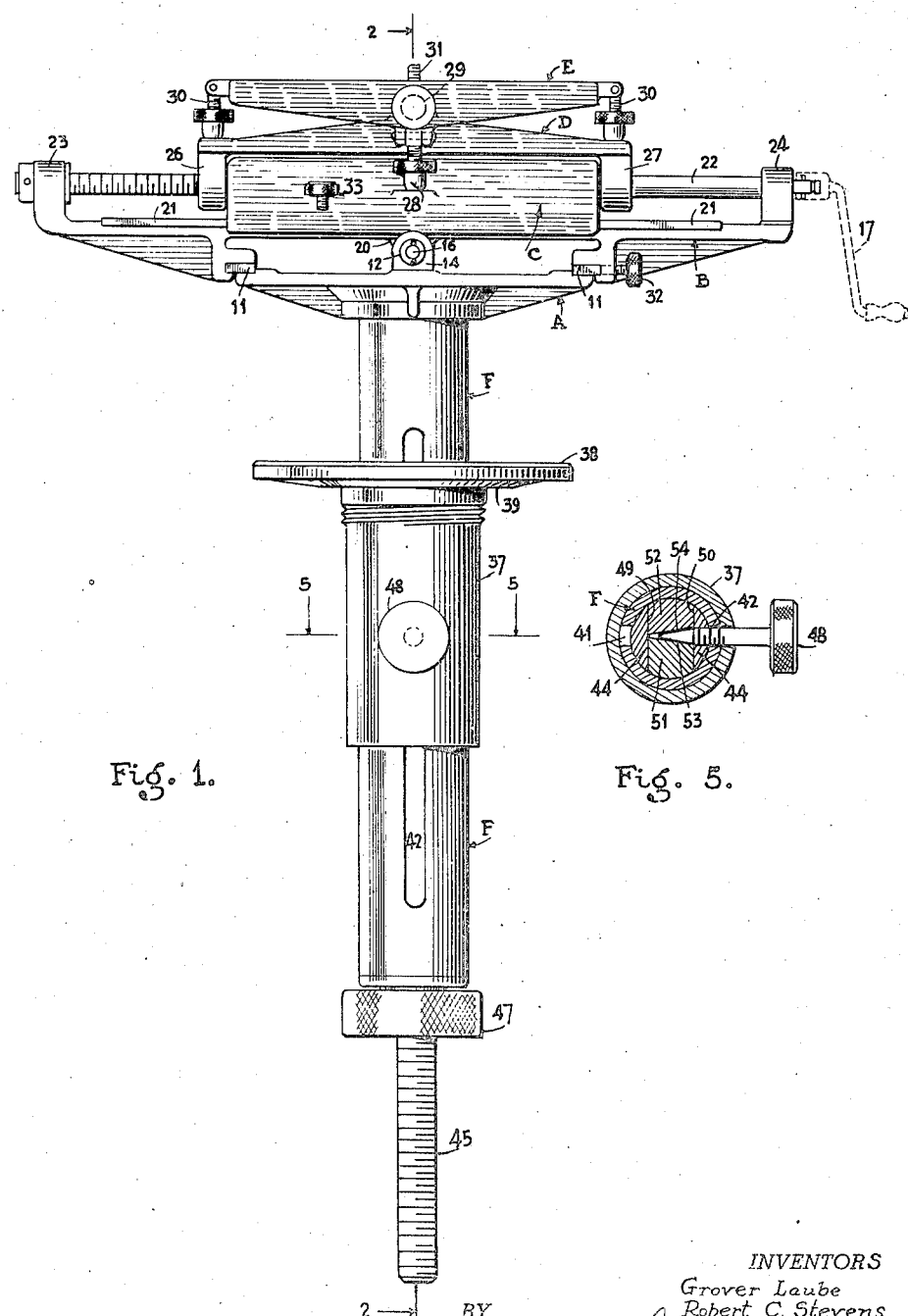
Figure 1 is an elevation of the mount as it would appear when not carried in a support, such as a tripod or a camera carriage.
Figure 5 is a cross sectional view on line 5—5 of Figure 1.
Figure 2:
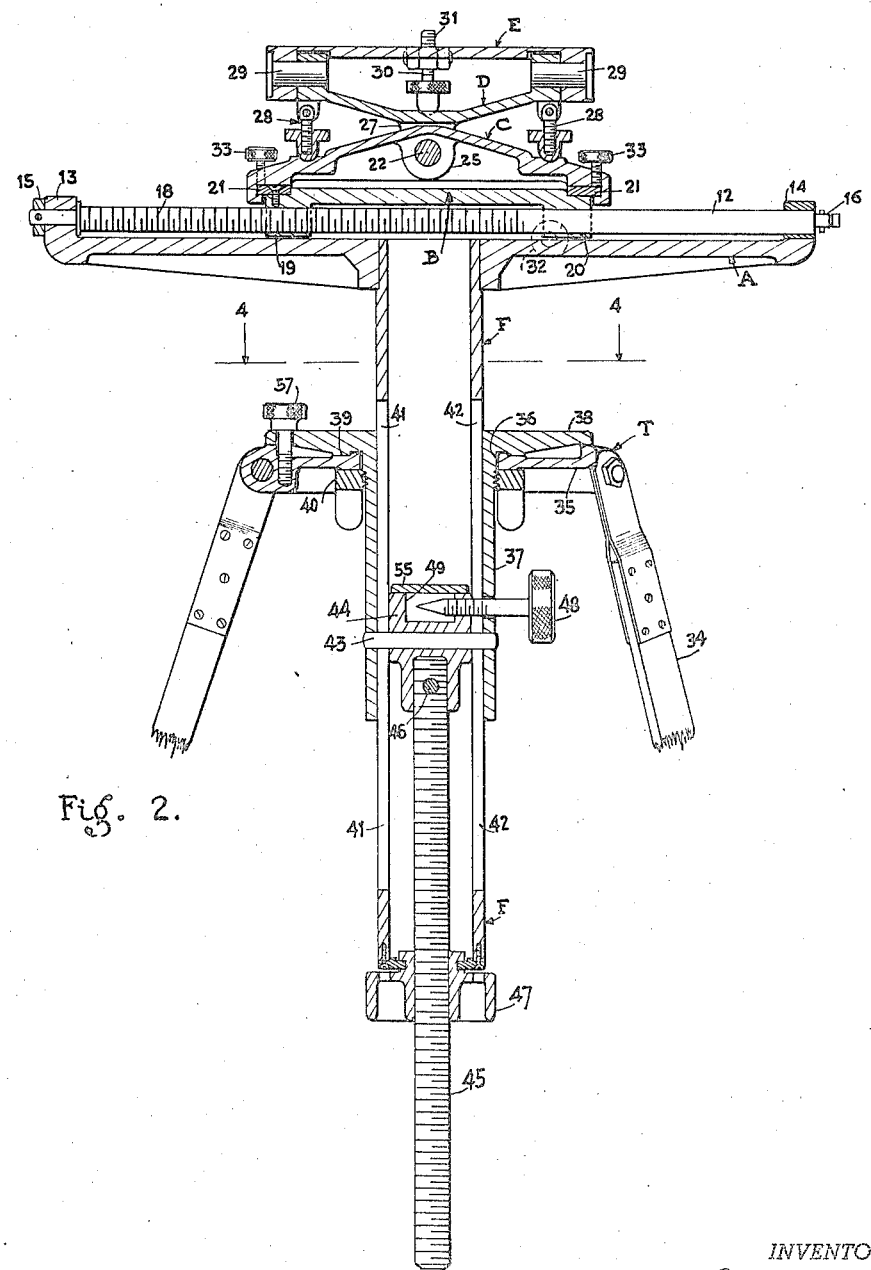
Figure 2 is a section on line 2—2 of Figure 1, showing a fragmentary view of a tripod supporting the same.
Figure 3:
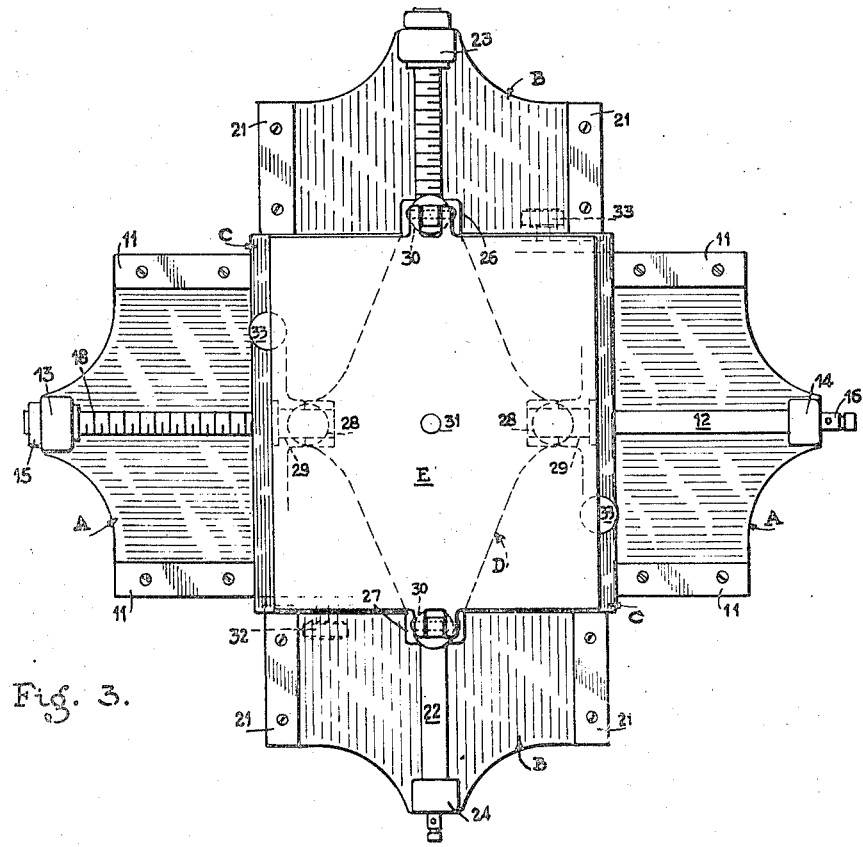
Figure 3 is a top plan view of the mount.
Figure 4:
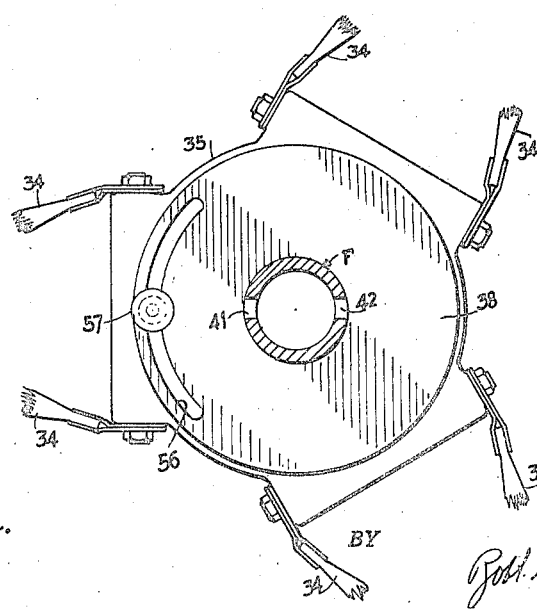
Figure 4 is a sectional view on line 4—4 of Figure 2.

Referring more particularly to Figures 1 and 2 for a detailed description of the above mentioned elements and means, it will be observed that the member A is mounted upon a cylindrical support generally designated F. In practice these two members are rigidly attached. The member A is provided with parallel tracks 11 on the edges thereof, upon which the member B is adapted to be slidably mounted. Means are provided for moving the member B along the tracks 11 and comprise a rod 12 rotatably mounted on the member A at its ends by means of the bearings 13 and 14 and held against longitudinal movement by a collar 15. One end of the rod 12 may be turned down, as shown at 16, to receive a handle 17 for rotating the same as indicated in dotted lines in Figure 1. The rod 12 is screw threaded, as indicated at 18, and screw threadedly engages a collar 19 on the member B. A second collar 20 is likewise provided on the member B, but for purposes of economy and manufacturing considerations this collar need not be threaded, since it is used only for a guide and holding member. However, if desirable, the collar 20 may also threadedly engage the rod. As the rod 12 is rotated, the member B is moved backward and forward on the tracks 11 as desired. The member B is likewise provided with tracks 21 similar to the tracks 11 of the member A, and upon these tracks the member C is movably mounted. Means are also provided for moving the member C upon the member B and takes substantially the same form as the means for this purpose mounted upon the member A; that is, it comprises a rod 22 rotatably mounted on the member B in bearings 23 and 24. The member C likewise has a collar 25 adapted to threadably engage the rod 22. As the rod 22 is rotated, the member C is moved backward and forward along the tracks 21 in identically the same manner as the member B is moved upon the member A. However, as observed in Figure 3, the tracks 21 are at right angles to the tracks 11, which provides a cross movement of the member C with respect to the member A, as well as a movement of the member C along the length of the member A.

As before stated, the member D is adapted to be moved with the member C and is arranged to be rocked on an axis with respect to this member. For this purpose the member D is provided with collars 26 and 27, which may or may not be threaded as desired and which are suitably mounted on the rod 22. Under this arrangement the member D moves with the member C and is pivotally mounted thereon. The means for rocking the member D comprises a pair of leveling screws generally designated 28 mounted on each side thereof at right angles to the axis formed by the rod 22. By manipulating the screws 28, it can be seen that the member D can be rocked relative to the member C on the axis of the rod 22.

The camera supporting member E is pivotally mounted upon the member D by means of pivots 29. A pair of leveling screws 30, similar to the screws 28, is provided at right angles to the pivots 29 for rocking the member E upon its pivot points. A conventional screw threaded means indicated at 31 is provided on the member E for mounting the camera (not shown) in the usual manner.

In order to provide the precision necessary in using a mount of this character, means are embodied for locking the various members against relative movement. For instance, the member B is locked upon the member A by means of thumb nuts 32 and the member C is locked upon the member B by similar thumb nuts 33. The other members D and E are held in fixed relation by means of the leveling screws 28 and 30.

The whole of the above assembly, as before stated, is supported upon a cylindrical member F, which in turn is rotatably and vertically movably supported upon a tripod T. The means for this purpose is best shown in Figure 2. Here it will be observed that the tripod generally designated T is supported upon the usual legs 34 fragmentarily shown. The legs 34 support a plate 35, which is a part of the conventional free-head, and has a central opening 36 therethrough. Slidably mounted upon the member F is a member 37 having a flange 38 thereon. The flange 38 may be formed with annular shoulders 39 arranged to bear upon the member 35 in any suitable manner such as shown. A lock nut 40 may be screw threadedly mounted upon the member 37 below the member 35. As shown, the member F is formed with slots 41 and 42 extending longitudinally thereof and the member 37 carries a pin 43 adapted to work through the slots. Supported by the pin 43 is a member 44 mounted internally of the member F. The member 44 in turn supports a screw threaded rod 45 which is attached thereto by any suitable means, such as a pin 46. The rod 45 screw threadedly engages a cap 47 which in turn is rotatably mounted upon the lower end of the member F and adapted to support the same. The means for mounting the nut 47 on the lower end of the member F may take a variety of forms, one of which is clearly shown and not described. From the foregoing, it will be seen that the load carried by the member F is transmitted to the rod 45 through the nut 47, and that the rod in turn carries the load back to the tripod T through the flange 38 of the member 37. Since the nut 47 is rotatably mounted in the member F, it can be readily seen that the whole assembly mounted on the member F may be raised or lowered by rotating the nut 47. In keeping with the precision characteristics of the mount provided, means are also provided for locking the movement of the member F relative to the supporting member 37. This means may take a variety of forms, one of which is shown here as comprising a thumb screw 48 which extends through the sprocket 42 in the member F and is screw threadedly mounted in the upper end of member 44. As shown in Figures 2 and 5, the upper end of the member 44 is provided with a slot having walls 49 and 50. The slot carries two members 51 and 52 which are adapted to fit the inner periphery of the member F and are formed with inclined faces 53 and 54 on their inner ends adapted to engage the tapered point of the thumb screw 48. As the thumb nut 48 is screwed inwardly, the members 51 and 52 are forced outwardly against the inner wall of the member F and form a friction lock against relative movement of the member F with respect to the member 37. A cover plate 55 is mounted over the top of the member 44 in any suitable manner and holds the members 51 and 52 in place. The arrangement described provides a means for raising and lowering the whole assembly on the tripod and for locking the same in place.

There is still another movement that is provided, which comprises rotating the whole assembly on the tripod. For this purpose the flange 38 is provided with a circular slot 56 concentric with the axis of the member F. A thumb screw 57 is adapted to extend through the slot 56 and is screw threadedly engaged in the plate 35 of the tripod T. When the thumb screw 57 is loosened, the flange 38 may be rotated upon the tripod T, it being understood that the lock nut 40 is sufficiently loose to permit rotation, and when the desired amount of rotation has been accomplished the whole device may be locked against rotation by tightening the nut 57.

From the foregoing arrangement of parts and means for moving the parts relative to each other, it is obvious that a camera mount may be provided wherein the camera may be moved up and down, backwards and forwards, sideways, rocked on two axes at right angles to each other, and rotated on a vertical axis. These movements, when combined into a unitary device, provide a camera mount having universal movement that may be used to good advantage in the art of making composite pictures, inserts, titles, etc., and may find general usefulness in any field where precision work is required.

We claim:

1. In a camera mount, a first traveling member adapted to be rectilinearly movable on a support, a second traveling member movably mounted on said first member, means for moving said second member at substantially a right angle to the movement of said first member, a third member pivotally mounted on said means, and a camera supporting member pivotally mounted on said third member.

2. In a camera mount, a first traveling member arranged to be rectilinearly moved on a support, a second traveling member movably mounted on said first member, means for moving said second member at substantially a right angle to the movement of said first member, a third member adapted to move with said second member and rotate with respect thereto, and a camera supporting member pivotally mounted on said third member.

3. In a camera mount, a first traveling member arranged to be rectilinearly moved on a support, a second traveling member movably mounted on said first member, means for moving said second member at substantially a right angle to the movement of said first member, a third member adapted to move with said second member and rotate with respect thereto, and a camera supporting member rotatably mounted on said third member, the axis of rotation of said camera supporting member being substantially at a right angle to the axis of rotation of said third member.

4. In a camera mount, a first traveling member arranged to be rectilinearly moved on a support, a second traveling member movably mounted on said first member, means for moving said second member at substantially a right angle to the movement of said first member, a third member adapted to move with said second member and rotate with respect thereto, a camera supporting member rotatably mounted on said third member, the axis of rotation of said camera supporting member being substantially at a right angle to the axis of rotation of said third member, and separate means for controlling the respective rotation of said rotatable members.

5. In a camera mount a support, a first traveling member adapted to be rectilinearly moved on said support, a second traveling member movably mounted on said first member, means for moving said second member at substantially a right angle to the movement of said first member, said means including a screw threaded rod rotatably mounted on said first member adapted to screw threadedly engage said second member and a third member pivotally mounted on said rod arranged to engage said second member and be moved therewith, and a camera supporting member pivotally mounted on said third member.

6. In a camera mount a support, a first traveling member adapted to be rectilinearly moved on said support, a second traveling member movably mounted on said first member, means for moving said second member at substantially a right angle to the movement of said first member, said means including a screw threaded rod rotatably mounted on said first member adapted to screw threadedly engage said second member and a third member pivotally mounted on said rod arranged to engage said second member and be moved therewith, means for adjusting the relative rotation of said third member with respect to said second member, a camera support pivotally mounted on said third member, and means for adjusting the rotation of said camera support with respect to said third member.

7. In a camera mount a support, a first traveling member adapted to be rectilinearly moved on said support, a second traveling member movably mounted on said first member, means for moving said second member at substantially a right angle to the movement of said first member, said means including a screw threaded rod rotatably mounted on said first member adapted to screw threadedly engage said second member and a third member pivotally mounted on said rod arranged to engage said second member and be moved therewith, a camera supporting member pivotally mounted on said third member, and means for raising and lowering said support to furnish third dimensional movement to said mount.

GROVER LAUBE.
ROBERT COLBY STEVENS.